UNITED STATES PATENT OFFICE.

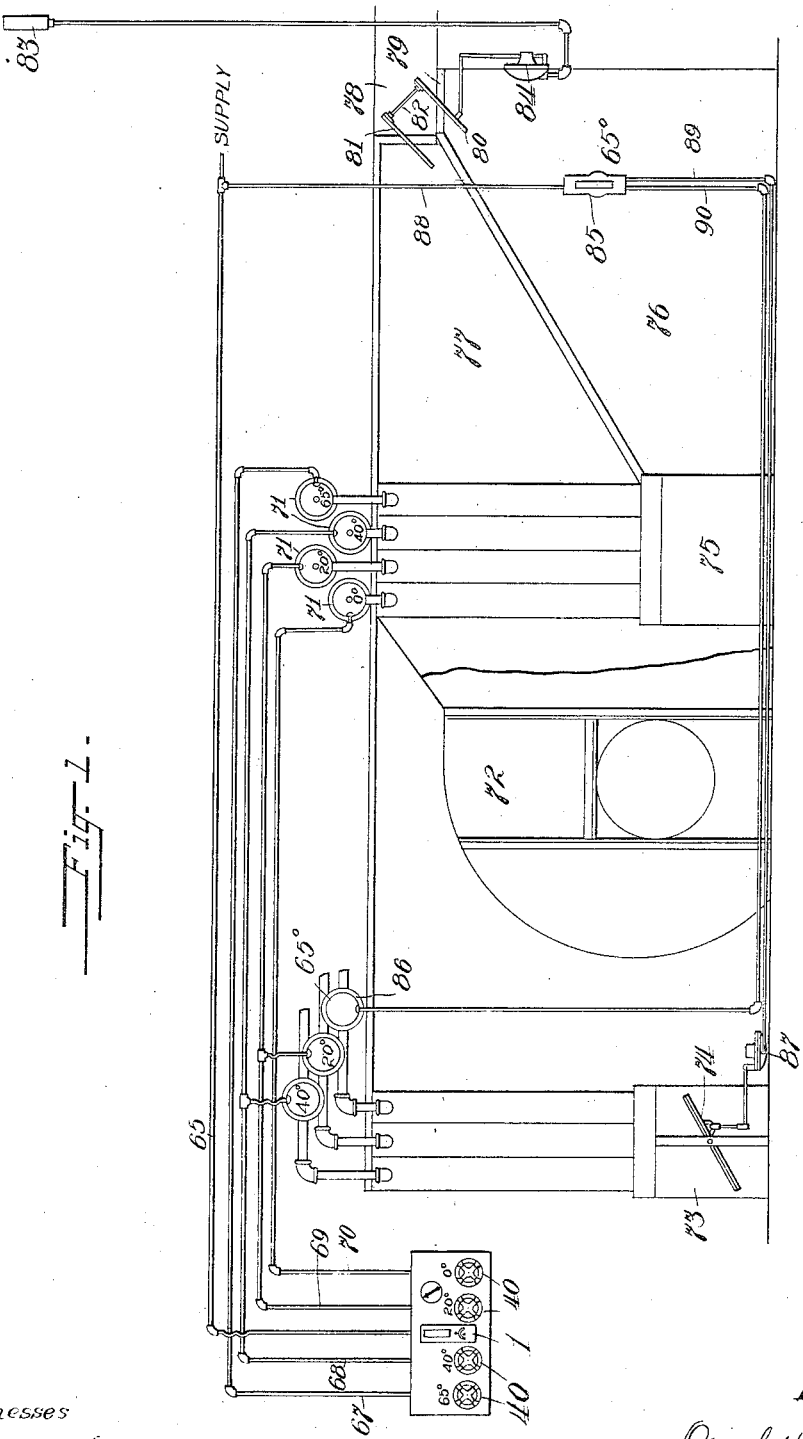

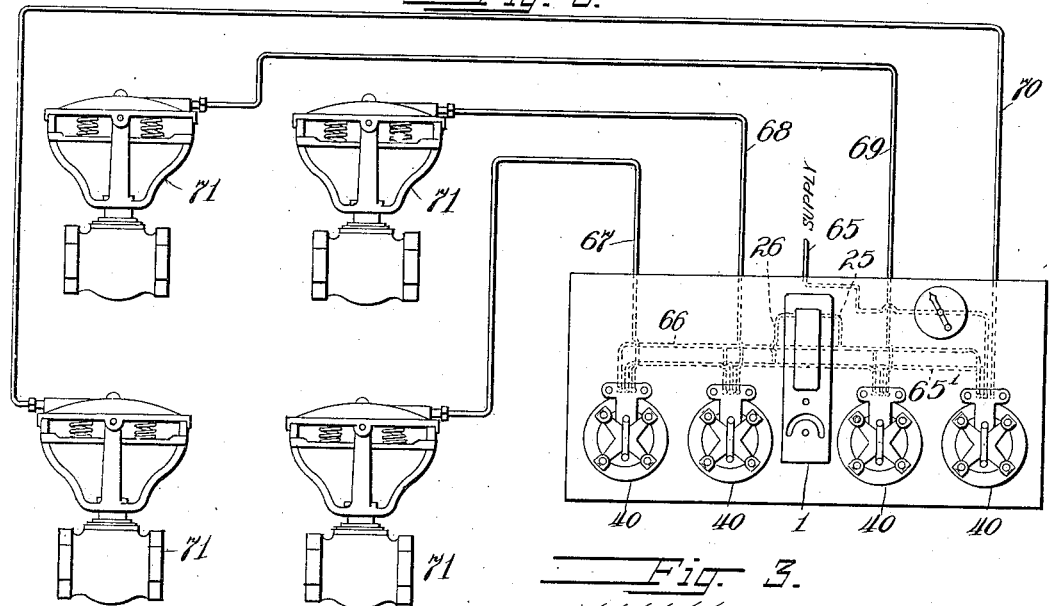
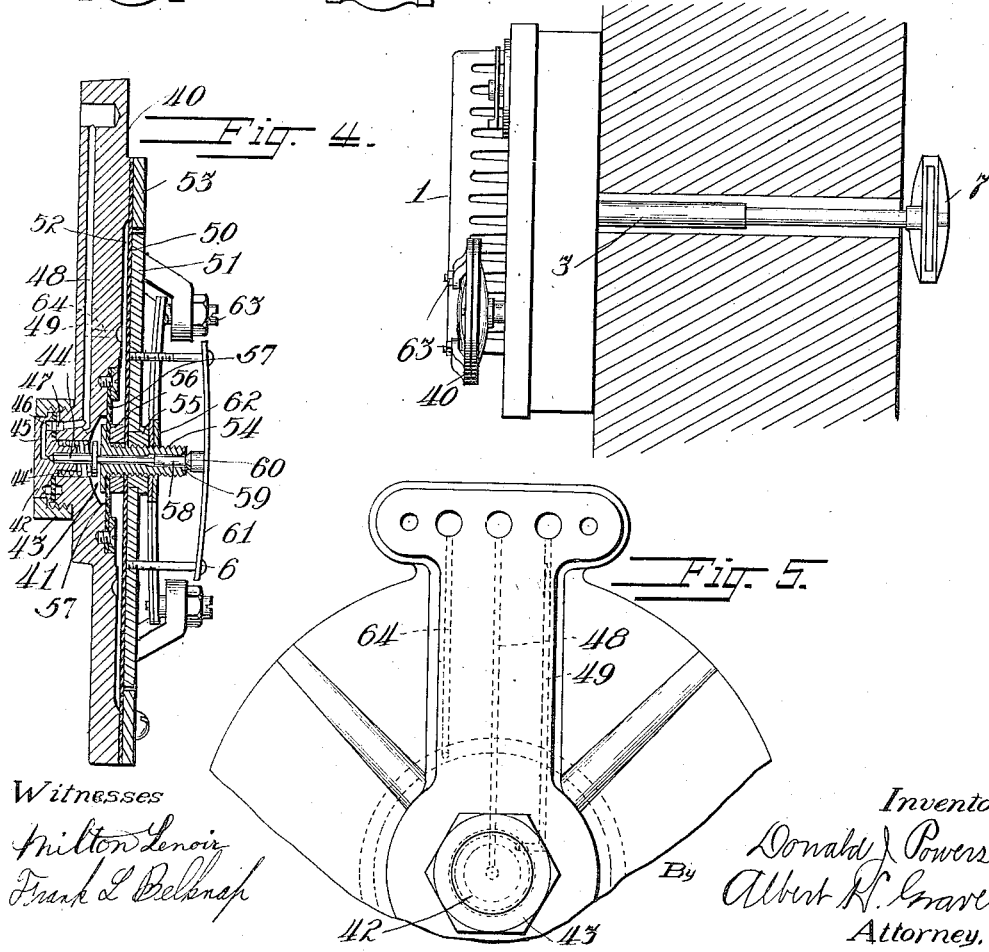

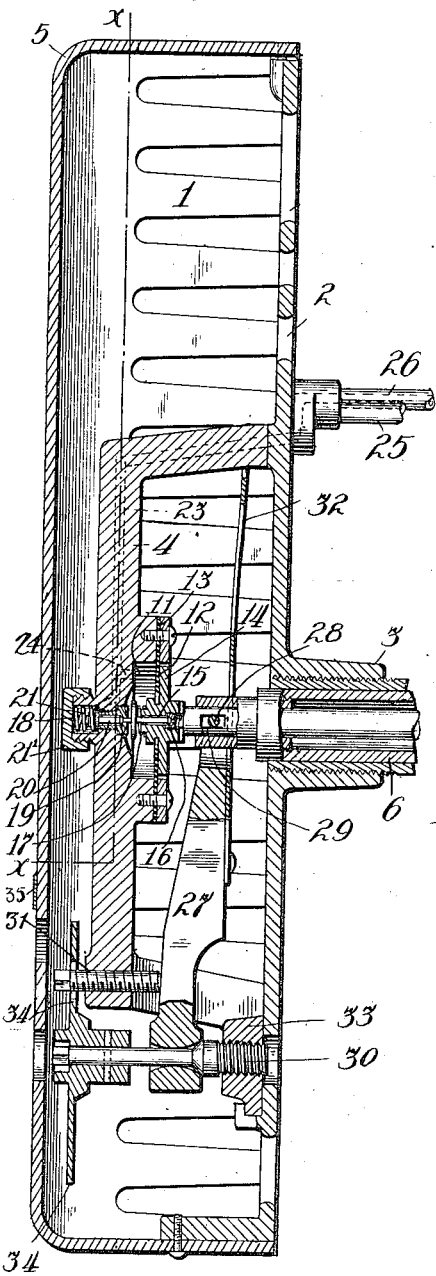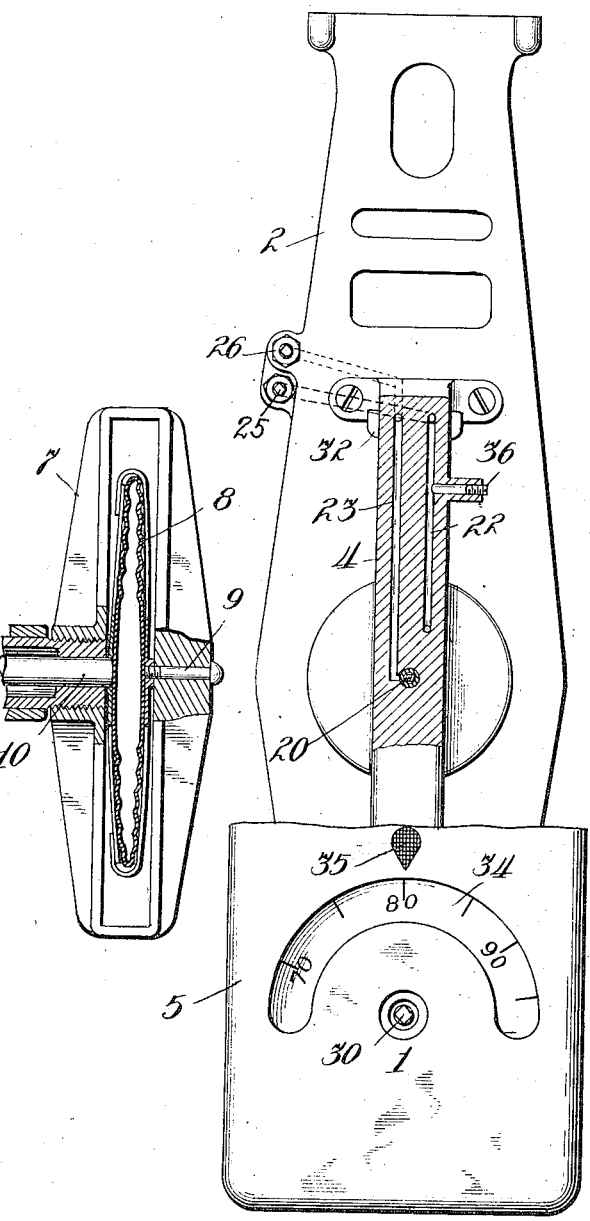

DONALD J. POWERS, OF NEW YORK, N. Y.

AUTOMATICALLY-REGULATED HEATING SYSTEM.

961,734.

Specification of Letters Patent. Patented June 14, 1910.

Application filed September 11, 1907. Serial No. 392,266.

*To all whom it may concern:*

Be it known that I, DONALD J. POWERS, a citizen of the United States, residing at New York, in the county of New York and State of New York, have invented certain new and useful Improvements in Automatically-Regulated Heating Systems, of which the following is a specification.

This invention relates to improvements in automatically controlled or regulated heating systems.

In systems of the general character to which this invention pertains it has heretofore been proposed to provide a plurality of heating sections or radiators to the action of which the heating air drawn from out-of-doors is subjected on its way to the apartments; and to provide a thermostat, for each of the several radiators or heating units, located out-of-doors or where they are subject to the outside temperature and set to bring the radiators into operation singly or together, as determined by the outside temperature. More commonly, however, the several radiators are manually controlled, and the engineer is depended upon for turning on and off the heating units as required. The use of a plurality of radiators each controlled by its own thermostat involves certain serious objections. For example: it is in practice necessary to vary the temperatures at which the several heating units or radiators will come into operation, to compensate for changes due to weather conditions other than mere temperature. Where a separate thermostat is employed to govern each regulator it will be obvious that if the several elements of the system are to be kept in proper correlation to each other, then the entire set of thermostats must be changed, *i. e.* regulated, whenever any one is regulated, and this regulation is necessarily largely dependent upon judgment and subject to the errors of the judgment. Again, the chances of imperfect operation of the apparatus are greatly multiplied by the use of separate thermostats and independent connections, and it is obvious that the failure of any one unit to operate properly would in such case produce no responsive effect upon the other units.

It is the object of the present invention to provide a system of automatic control which accomplishes the regulation of all of the heating units through the action or control of a single thermostatic element coöperating with a motive fluid supplied in such manner that as the temperature rises from its minimum to its maximum, the heating units will be successively cut out of operation, and vice versa, as the temperature falls the several heating units will be brought into operation in the reversed order.

Secondary objects of the invention are to provide a system in which the adjustment of the main controlling thermostatic element effects a properly proportioned modification of the heating effect of the entire system; to provide a system so organized that while the thermostatic element is exposed to the outside temperature all of the motive fluid system controlled thereby is arranged within the building and protected against radical changes of temperature and the difficulties of operation incident thereto; to provide a system which is pneumatic throughout practically all of its organization and admits of the use of thoroughly demonstrated practical instruments of the prior art for carrying the system into effect.

To the above ends the invention consists in the matters hereinafter described, and more particularly pointed out in the appended claims.

In the drawings—Figure 1 is a diagrammatical view showing the several features of the system in coöperative relation; the several instrumentalities being largely indicated diagrammatically; Fig. 2 is a second diagrammatical view showing more particularly the pipe connections between the controlling thermostat and the relays, and between the latter and the valve controlling motors; Fig. 3 is a view showing in section the external wall of the building with the thermostat applied to extend through the wall; the thermostat and one of the relays being shown in side elevation in the view; Fig. 4 is a central vertical sectional detail through the body and valve mechanism of one of the relays; Fig. 5 is a fragmentary view in face elevation of one of the relays, showing in dotted lines the air ducts; Fig. 6 is a view partly in side elevation but chiefly in central vertical section of the main controlling thermostat; Fig. 7 is a view chiefly in face elevation but partly in section of the thermostat.

In the preferred and particular embodiment of the invention illustrated, the heating system is primarily controlled or regulated by the out-of-door temperature conditions, but in its broader aspect the invention is not confined to this application.

Describing first and separately the several instruments which form important parts of the preferred embodiment of the invention shown herein, and referring to the figures in the drawings, 1 designates as a whole the controlling thermostat, which is so constructed as to combine with its expansible element, mechanism controlling a pneumatic system of motive fluid, and hereinafter termed as a whole a pressure varying mechanism. The thermostat shown, in so far as its expansible element and control by the latter of the pressure varying mechanism are concerned, is substantially the same as that shown and described in Patent No. 764,819, granted to William P. Powers July 12th, 1904. In the thermostat of that patent, however, a secondary control of the motive fluid is provided for insuring the turning on of full pressure to a motor controlled thereby whenever the pressure transmitted through the primary control arrives at a predetermined stage. In the invention now to be described there is an analogous secondary control of the motive fluid, but this secondary control is accomplished through the medium of a series of relays operating independently of each other and under control of the thermostat, though entirely separated therefrom. These relays are in general construction and principles of operation analogous to the secondary control mechanism of the thermostat of said Patent No. 764,819.

Referring more particularly to Figs. 6 and 7, 2 designates a frame plate, 3 a tubular frame extension connected with the central part of the plate and extending at right angles therefrom, and 4 a bridge frame member mounted upon the frame plate at the opposite side of the tubular extension; these three members constituting the main frame of the device. A detachable skeleton cover 5 is arranged to protect the mechanism upon the front side of the plate, as usual. An inner tube or sleeve 6 is mounted to extend through the tubular frame extension 3 and is susceptible of endwise movement therein, and upon the end of this inner tube is mounted a yoke frame 7, within which is supported a hollow expansion disk 8 containing a volatile liquid, which will be partly converted into gas at a temperature somewhat below that at which the thermostat is designed to come into action; this expansion disk *per se* being of well understood construction. The outer side of this disk rests at its center against a fixed support, as 9, while its opposite face engages the end of an actuating rod 10 mounted to extend loosely through the inner tube 6 and into proximity to the inner side of the central part of the bridge frame 4. Within the bridge frame is formed a chamber 11, one side of which is formed by a flexible diaphragm 12 having its periphery clamped to the frame, as indicated at 13, and its central portion connected with a valve housing 14. Through the valve housing is formed a port through which extends a vent valve 15 which operates against a seat 16 and so closes the vent passage. Valve 15 is acted upon by a coiled spring 17 tending to normally lift it from its seat. Within a nipple-like extension upon the outer side of the frame member 4 is formed a chamber 18, and from this chamber a port or passage extends to chamber 11; the inner end of this port terminating in a valve seat 19 surrounding a reduced part of the port. An admission valve 20 extends through this port and is normally held against the seat 19 to close the port by means of a coiled expansion spring 21 interposed between the head of the valve and a screw-cap 21'. The tip of the valve 20 projects through the port into the chamber 11 in position to be engaged by the head of the vent valve 15.

Two ducts 22 and 23 (see Fig. 7) are formed to extend through the upper half of the bridge frame, one of these, 23, communicating with the valve chamber 18 and the other with the chamber 11, as indicated in dotted lines at 24. The outer end of duct 23 communicates with a supply pipe 26, and similarly duct 22 communicates with a pipe 25 which delivers air to the series of relays to be hereinafter described.

Assuming air to be supplied through pipe 26 and duct 23 under substantially constant pressure, normally the admission valve 20 would be closed and entrance of the air to the chamber thus prevented, while the vent valve 15, if the expansion disk be sufficiently collapsed, will be open. If, now, the expansion disk expands under a rise of temperature sufficiently to move the actuating rod 10, the latter will engage and force inwardly the valve housing 14, first seating and closing the vent valve (the spring of the latter being weaker than that controlling the admission valve) and thereafter through the engagement of valve 15 with the admission valve, lift the latter and so admit pressure to chamber 11. The pressure in this chamber acting on its diaphragm will oppose the expansive action of the disk, and as soon as sufficient pressure is admitted to counterbalance that exerted by the expansion disk, the diaphragm of chamber 11 will be forced outwardly by spring 18, and the admission valve will return to its seat. Should the outside temperature continue to rise, the expansion disk will presently again open the admission valve and equilibrium again be established at a higher pressure. In other words, the pressure obtaining in chamber 11 and that part of the system beyond and in communication with that chamber will always be a pressure which counterbalances the expansive pressure of the vapor in the expansion disk at the particular temperature to which the latter is at the time subject. This variable pressure is utilized for operating a series of relays successively, and these relays in turn control corresponding valve motors.

In order that the thermostat may be adjusted so as to come into effective operation at any predetermined temperature, an adjustment is provided between the actuating rod which is moved by the expansion disk and the tubular frame member 6 which carries the expansion disk. To this end the tubular frame 6 is adjustably connected and held in fixed relation to the main frame through the medium of an adjusting lever 27, the upper end of which is forked to embrace the end of the frame member 6 and connected with the latter by means of a through-pin 28 extending through said forks. In order that this through-pin may not interfere with free movement of the actuating rod, the latter is longitudinally slotted, as indicated at 29, to receive the through-pin. The lower end of lever 27 is supported upon a rotatable adjusting screw 30 and its intermediate portion fulcrumed against a stud 31 mounted in the lower part of the bridge frame 4. The forked upper end of the lever is actuated by a plate-spring 32 secured thereto and bearing against the upper part of the bridge frame. By rotating the adjusting screw, the lever 27 is oscillated positively, in one direction against the tension of the spring 32 and in the other with the spring, thus shifting the tubular frame 6 bodily. Inasmuch as this amounts to effecting a relative approach or departure between the expansion disk and actuating rod, the desired adjustment is effected. A graduated disk 34 is secured upon the adjusting screw 30 and coöperates with a fixed pointer or indicating mark 35 upon the bridge frame. The end of screw 30 is squared to receive a key whereby it may be actuated. The duct 22 which leads to the set of relays is provided with a cap 36 whereby it may be opened to test whether or not the motive fluid is passing through the controlling thermostat or pressure-varying mechanism.

Describing next the construction of one of the relays (all of them being alike except that they are by adjustment of their springs set to operate at different pressures), and referring more particularly to Figs. 4 and 5, 40 designates a disk-shaped main body provided at its center with a hub-like enlargement, within which is formed a by-pass valve chamber 41, the outer end of which is closed by a cap 42 clamped in position by a screw ring 43. Cap 42 is provided axially with a valve port which is controlled by a by-pass valve 44, and a cross passage 45 formed in the cap communicates at one end with the port controlled by valve 44 and at its opposite end with an annular channel 46 in the cap. Channel 46 overlies a corresponding channel 47 formed in the main body, and a duct 48 leads downwardly from the upper end of the main body (see Fig. 5) through the latter to, and communicates with, the channel 47. A packing disk is interposed between cap 42 and the main body, this disk being apertured to afford free communication between the channels 46 and 47, as seen clearly in the drawing. The sides of the by-pass valve 44 are channeled so that as soon as the valve leaves its seat or bearing against the end of the port, communication is established between the duct 48 and the chamber 41. From the chamber 41 a duct 49 leads out through the body of the valve, as indicated clearly in Figs. 4 and 5.

The back face of the valve body 40 is slightly recessed over a relatively large area, and over this is arranged to lie a flexible diaphragm 50 to which is secured a diaphragm plate 51 of nearly the same area as the diaphragm chamber 52 formed by the recess referred to, which it overlies. The periphery of the diaphragm is secured to the valve body 40 by a suitable ring, as indicated at 53, and the center of the diaphragm is secured to an externally threaded valve sleeve 54 between a clamping nut 55 and a space ring 56. The diaphragm chamber 52 is separated from the chamber 41 by a smaller flexible diaphragm 57 having its periphery suitably secured to the valve body 40, and its central portion secured to the valve sleeve 54; the latter being for this purpose headed at its inner end, and the diaphragm 57 interposed between the space ring 56 and the flange of the head. Valve sleeve 54 is axially bored to receive a stem valve 58; the outer end of the valve sleeve terminating in a conical seat 59 with which coöperates the correspondingly tapered and enlarged or headed end 60 of the valve 58. Valve 58 is normally pressed toward its seat by a bow-spring 61, the central portion of which engages the valve, and the ends of which are carried by screw studs 62 seated in the plate 51. The inner end of the valve member 58 engages the headed end of the valve 44; the latter being normally pressed away from its seat by a coiled expansion spring 44'. The diaphragm plate 51 with the parts carried thereby is normally pressed inwardly by means of a duplex star-shaped spring 62 having its central portion connected with the valve sleeve 54 and its several radial arms engaged with adjustable studs 63 carried by brackets upon the ring 53 and which overhang the diaphragm plate. From the diaphragm chamber 52 a duct 64 leads out through the main valve body 40, as shown clearly in Fig. 5.

The operation of the relay is as follows: Assuming that the duct 64 of the relay be connected with the pipe 25 which contains motive fluid under graduated pressure; that the duct 48 be connected with a part of the main supply pipe containing air under the full or unmodified pressure, and that the duct 49 be connected with a pipe leading to the valve motor which is to be actuated through the relay, the by-pass valve 44 will normally be closed and the diaphragm chamber 52 subject to the reduced pressure transmitted through the thermostat. If, now, the pressure in chamber 52 rises sufficiently to force back the larger diaphragm, the initial movement will result in closing valve 58 (which is normally open) and thereafter permit valve 44 to open. Thereupon pressure will be admitted through duct 48 to the by-pass chamber, thus adding this pressure to that already obtaining in chamber 52 and accordingly forcing the diaphragm 50 far enough out to fully open the port controlled by valve 44. An ample flow of motive fluid will then pass out through the by-pass chamber and passage 49 to the valve motor, and this will result in shutting off the particular heat unit controlled by that valve motor. Should a fall in temperature ensue, the thermostatically-controlled variable-pressure mechanism will by its automatic venting action hereinbefore described reduce the pressure in chamber 52, whereupon the diaphragms of that chamber will move inwardly under the action of the spring 62, first closing valve 44, thus shutting off the flow of full pressure to the valve-motor and thereafter, in the further inward movement of the diaphragms, opening valve 58, thus venting the by-pass chamber 41 to the atmosphere and thereby relieving the valve motor diaphragm of restraining pressure, whereupon the motor will open its radiator valve under the action of its motor springs, in a manner hereinafter described.

The valve motors controlled by the several relays may be of any suitable construction which will respond to the pressure of the motive fluid transmitted thereto through the relays, as hereinbefore described; such valve motors being well known in this art. Described in general terms, they are diaphragm motors, each having its diaphragm directly connected to the stem of the radiator valve which it controls; the diaphragm being subject to the pneumatic pressure on one side and acted upon by one or more expansion springs on the other side. The tendency of the spring or springs is to collapse the diaphragm against the pneumatic pressure, open the connected radiator valve, and thus turn on the heat.

Referring now to diagrammatic Fig. 1, wherein the several features of the system are shown connected, the primary thermostat with its group of associated relays is shown as mounted upon the inner surface of the wall of a building, it being understood that the expansion disk is located outside the building and operatively connected with the thermostat through the wall, after the manner shown in detail in Fig. 3. The details of the pipe connections with the primary thermostat and several relays are best shown in Fig. 2, in which it will be seen that the supply pipe 65, from the source of air or other motive fluid under constant pressure, connects with a cross-pipe 65', from which branches lead to and connect with the central ducts 48 of each of the relays. Another branch 26 (see Fig. 6) connects with, and supplies air to, the thermostat. From the delivery side of the thermostat, pipe 25 leads to, and connects with, a cross-pipe 66 provided with branches leading to, and connecting with, the ducts 64 (see Fig. 5) of each of the several relays. From the opposite or delivery side of each relay, (duct 49) a pipe, as 67, 68, 69 and 70, leads to, and connects with, one or more corresponding valve motors 71. For convenience of illustration the several relays are designated 0°, 20°, 40° and 65°, and for ease of identification the valve motors connected with the several relays are correspondingly marked; such marking indicating, in the example given, that as the temperature rises from below zero upwardly, the several relays will bring the corresponding valve motors into operation at the several stages of temperature at which they are set to operate and close their respective valves, and, vice versa, as the temperature falls, the several relays will actuate the valve motors to cut in the heating units successively.

Two groups of heating coils are shown, the smaller group designated "tempering coils" and the larger group "main heating coils". The tempering coils are located in the air admission passage between the point of entrance of air to the building and the fan 72, which induces the circulation. The main heating coils are arranged, as shown, in the main discharge passage or duct leading from the fan or blower. In order that part of the air admitted from the outside may pass to the fan or blower without previous heating, a by-pass 73 is provided below the tempering coils, which passage is controlled by a damper 74 in a manner hereinafter described. In a somewhat similar manner a by-pass 75 is provided below the group of main heating coils, which latter passage leads to a chamber 76 below the main delivery duct 77, and which may be conveniently termed a tempered air chamber. The delivery end of the main discharge duct 77 is connected with the several trunks, (of which one 78 is shown) which lead to the several apartments to be supplied. The tempered air chamber is common to, and communicates with, each of these several distributing ducts 78 through openings, as 79, severally controlled by individual dampers 80. The entrance to each distributing duct 78 is likewise controlled by a damper 81, and as shown the dampers 80 and 81 are coupled by means of links 82, or other suitable mechanical connection, so as to move together. In passing, it is to be remarked that each pair of dampers 80, 81, is controlled by a thermostat 83, located in the particular apartment served by the distributing duct in question; each thermostat 83 being connected back to a damper motor 84 which operates its pair of dampers, in a manner clearly shown in the drawings and perfectly understood in this art. The arrangement of each pair of dampers is such that as they move together they assume positions which vary the proportions of hot air admitted from the main discharge duct and tempered air admitted from the tempered air chamber.

In connection with the foregoing description, a brief statement of the operation will render the inter-relations of the several features clear. Assume an outside temperature of say 35° and the temperature rising: In such event the two relays designated 65° and 40°, respectively, will have their supply valves closed and the waste valves open, and the corresponding valve motors will be open, and the heating coils controlled by said motors in operation. In the instance shown there will be two main heating coils and one tempering coil in operation. If, now, the temperature continues to rise until it reaches 40°, the thermostat will afford sufficient pressure to operate the 40° relay, the valve of which will thereupon open and admit the air pressure to the two corresponding valve motors and thus shut off one of the tempering coils and one of the main heating coils. If the temperature continues to rise sufficiently to bring the 65° relay into operation, all heat will be shut off. Vice versa, should the temperature fall, the corresponding contraction of the expansion disk of the thermostat will result in venting and lowering the pressure transmitted to the several relays, in a manner hereinbefore fully described, and thereupon the diaphragm chambers of the latter will successively collapse under the action of their springs, thus relieving the corresponding valve motors of pneumatic pressure and allowing the springs of the latter to open the valves and turn on the heat.

One of the tempering coils is controlled by a motor 86 which is in turn controlled by a compound thermostat 85 located in the tempered air chamber 76; this motor being for convenience marked 65° to correspond with the temperature at which the compound thermostat, which is likewise marked, is, in the illustration, set to act. The tempering damper 74 hereinbefore referred to is also controlled by the same compound thermostat 85 but through the medium of a damper motor 87 which requires no special description, being common and well understood in this art. The compound thermostat is, or may be, of the type and construction shown and described in Figs. 1 and 2 of Patent No. 764,819, issued to William P. Powers July 12, 1904. Described briefly, this thermostat provides a primary graduated control of the air by a mechanism which is essentially the same as that of the thermostat shown and described in the present application, and also provides a secondary control of the air (to secure positiveness of action) through a mechanism which performs substantially the same function as does one of the relays described in the present application.

A supply pipe 88 delivers air to the thermostat 85, a graduated pressure pipe 89 delivers air under graduated pressure from the thermostat to the damper motor 87 and oscillates the damper to an extent proportional to the degree of pressure transmitted, and a positive pressure pipe 90 delivers air from the thermostat 85 to the motor 86 which is, or may be, identical with the other motors of the system hereinbefore described.

In operation, it will be obvious that whenever an additional one of the tempering coils is either cut into operation or cut out of operation the air delivered to the tempering chamber 76 will be correspondingly modified, and it is the function of the graduating damper 74 to modify the abruptness of these changes in temperature by admitting an increased or decreased amount of cold air through the by-pass 73. Assuming one of the tempering coils to be cut in, the compound thermostat 85 responding to the increase of temperature, will admit increased pressure to the damper motor 87 and open the damper 74 wider; and the increased proportion of cool air will tend to restore the tempering chamber to normal. Vice-versa, as the temperature in the tempering chamber decreases by the cutting out of a tempering coil, damper 74 will be moved toward a closed position.

From the foregoing it will be understood that the system as a whole is entirely automatic, and the several regulating instrumentalities are so interconnected and interrelated that proper conditions are maintained throughout. Furthermore, whenever during different seasons of the year it is found desirable to modify the ultimate temperature of the air delivered to the apartments, it is only necessary for the engineer to adjust the single main thermostat as to the temperature at which it will come into operation, and by so doing he will have adjusted or modified the whole regime of the system and at the same time preserve due and proper relations between the several parts thereof.

By reason of the arrangement adopted the controlling thermostat is located outside the building where it is properly and instantly responsive to changes in the weather, and obviously regulates the heating effect in direct relation to the temperature of the outside air which is being admitted; the arrangement of the pressure varying mechanism and relays controlled thereby inside of the building, yet in perfect operative connection with the thermostat, enables the piping and other pneumatic connections to be all arranged inside the building where they will be subject to only minor fluctuations in temperature, and accordingly avoids the serious objections incident to condensation, frost and other effects produced by radically changing the temperature of the motive fluid used while within the system. That feature of the system which involves the actuation of the relays by means of a graduated pressure is particularly important in this respect, viz: That should a relay by reason of misadjustment, mechanical friction, corrosion, or for other reasons, refuse to operate at the particular pressure at which it is intended to operate, the system is in no sense disabled because the very condition following will insure the continued increase of pressure transmitted to the relay by the thermostat until it does operate, or until some other relay in the series operates, and so brings into operation an additional heating unit.

I claim as my invention:

1. In an automatically regulated heating system, the combination of an expansive fluid thermostatic element, motive fluid pressure-varying mechanism controlled by said thermostatic element embodying automatically acting valve mechanism whereby the pressure transmitted therethrough is opposed to, counterbalanced and determined by the variable pressure of the expansive fluid thermostatic element, a series of relays connected in common with the variable pressure side of said pressure varying mechanism and operable at different stages of pressure, valve motors controlled by said several relays, radiators independently and severally controlled by said valve motors, means for circulating air in heat-absorbing proximity to said radiators, a source of unheated air supply leading to the supply of air heated by said radiators, a graduating damper controlling said source of un-heated air, and a thermostat subject to the heat of the air heated by said radiators and arranged to automatically control said graduating damper.

2. In combination with a building to be heated provided with an air heating chamber through which the supply of air enters, a series of radiators arranged in said chamber and corresponding valves controlling the same, a series of valve motors controlling the respective radiator valves and normally tending to open the latter, a series of pneumatically controlled relays operable at different stages of pressure and connected to transmit motive fluid under pressure to said valve motors, an expansive fluid thermostatic element located subject to the outside temperature, a motive fluid pressure-varying mechanism controlled by said thermostatic element to transmit motor fluid under pressure to actuate the several relays, means for impelling and circulating air in heat-absorbing proximity to said radiators, means for admitting un-heated air to the warmed air which has passed the radiators, a thermostat subject to the heat of said warmed air, and automatic damper mechanism controlling the admission of un-heated air and itself controlled by said latter thermostat.

3. In combination with a building to be heated provided with an air heating chamber through which the supply of air enters, an air-impeller arranged within said chamber, a plurality of radiators in proximity to which the entering air passes on its way to the impeller, a second series of radiators in proximity to which the air is directed by said impeller, a series of valve motors controlling the several mentioned radiators and normally tending to open the latter, a series of pneumatically controlled relays operable at different stages of pressure and connected to transmit motive fluid under pressure to said valve motors, an expansive fluid thermostatic element located subject to the outside temperature, a motive fluid pressure-varying mechanism controlled by said thermostatic element and itself serving to transmit motor actuating pressures to the several relays, a by-pass for admitting un-heated air past the first set of radiators to said air-impeller, an automatic damper controlling said by-pass, and a thermostat, subject to the heat of the air passing onward from the air-impeller, and operatively connected to control said damper.

DONALD J. POWERS.

Witnesses:
DOUGLAS MACCALLUM,
O. WEILBACHER.